(12) United States Patent
Galvagno

(10) Patent No.: US 6,896,279 B2
(45) Date of Patent: May 24, 2005

(54) MOTORCYCLE WITH HANDGRIP FOR THE PASSENGER

(76) Inventor: Vincenzo Galvagno, Via Campagna 14, Serocca d'Agno (CH)

( * ) Notice: Subject to any disclaimer, the term of this patent is extended or adjusted under 35 U.S.C. 154(b) by 0 days.

(21) Appl. No.: 10/441,838

(22) Filed: May 20, 2003

(65) Prior Publication Data
US 2004/0069552 A1 Apr. 15, 2004

(30) Foreign Application Priority Data
Oct. 2, 2002 (IT) .................................... MI2002A2078

(51) Int. Cl.$^7$ ............................................. B62J 27/00
(52) U.S. Cl. ................................. 280/304.5; 280/293
(58) Field of Search ........................... 280/304.5, 293, 280/295, 288.4, 281.1, 270, 274, 279; 16/426, 421–22; 74/551.1, 551.9, 551.8, 551.3; 180/219, 218

(56) References Cited

U.S. PATENT DOCUMENTS

| | | | | |
|---|---|---|---|---|
| 3,695,480 A | * | 10/1972 | Castiglia | .................... 220/376 |
| 4,068,859 A | * | 1/1978 | Dittman | .................... 280/304.4 |
| 4,099,645 A | * | 7/1978 | Muth et al. | .................. 220/304 |
| 4,666,172 A | * | 5/1987 | Hartmann | .................... 280/238 |
| 5,002,149 A | | 3/1991 | Watanabe et al. | |
| 5,664,716 A | * | 9/1997 | Nuckolls | ..................... 224/430 |
| 6,176,405 B1 | * | 1/2001 | Roach | ........................ 224/414 |
| 2003/0196299 A1 | | 10/2003 | Trottier | |

FOREIGN PATENT DOCUMENTS

| | | | | |
|---|---|---|---|---|
| CA | 2372324 | * | 8/2003 | ........... B62K/11/14 |
| CA | 2419169 | * | 8/2003 | ............ B62J/27/00 |
| DE | 86 16 509 U1 | | 8/1986 | |
| JP | 02 114077 A1 | | 4/1990 | |

* cited by examiner

Primary Examiner—Avraham Lerner
(74) Attorney, Agent, or Firm—Akerman Senterfitt

(57) ABSTRACT

Motorcycle of the type comprising a frame, a seat for the rider, a seat for the passenger, a handgrip for the passenger, a fuel tank, an opening in said tank, a orifice flange situated in said opening, a cap for closing the tank situated inside said flange and a handgrip for the passenger associated with the orifice flange.

30 Claims, 4 Drawing Sheets

MOTORCYCLE WITH HANDGRIP FOR THE PASSENGER

FIELD OF APPLICATION

The present invention refers to a motorcycle of the type comprising a frame, a seat for the rider, a seat for the passenger, a handgrip for the passenger, a fuel tank, an opening situated on said tank for filling up with fuel and an orifice flange at said opening for receiving a cap for closing the tank.

PRIOR ART

With regard to the use of motorcycles it is well known the need to provide also the possible passenger transported on it with some valid means suitable for preventing, or at least avoiding as much as possible, an accidental unsaddlement.

And it is known that, to satisfy such requirement, suitable handgrips have been proposed and widely used, formed at the ends of rigid supports, substantially handlebar-shaped and fixed to the frame of the motorcycle in a position between the rider's seat and that of the passenger or even behind the latter.

Although advantageous from varius points of view, handgrips of the aforementioned type suffer from a recognised drawback. Actually, due to their positioning very close to the passenger, they cannot ensure the necessary stability in the case of hard braking or in the case of sudden accelerations.

To overcome this drawback, L-shaped tubular grips have been adopted fixed to the motorcycle tank through welding.

Although advantageous from some points of view, the tubular grips described above suffer from a recognised serious drawback. Indeed, they are difficult to install and they require complicated tools and laborious assembly operations by the manufacturer.

SUMMARY OF THE INVENTION

The technical problem underlying the present invention is that of realizing a motorcycle of the aforementioned type having structural and functional characteristics so as to overcome the drawbacks of the above described prior art.

The aforementioned technical problem is solved, according to the present invention, by a motorcycle of the type specified characterized in that said at least one handgrip is associated with said orifice flange.

Further characteristics and advantages of the invention will become clearer from the detailed description of an embodiment of a motorcycle according to the invention, given hereafter with reference to the attached drawings, for indicative and non-limiting purposes.

DETAILED DESCRIPTION OF THE INVENTION

Figure 1:
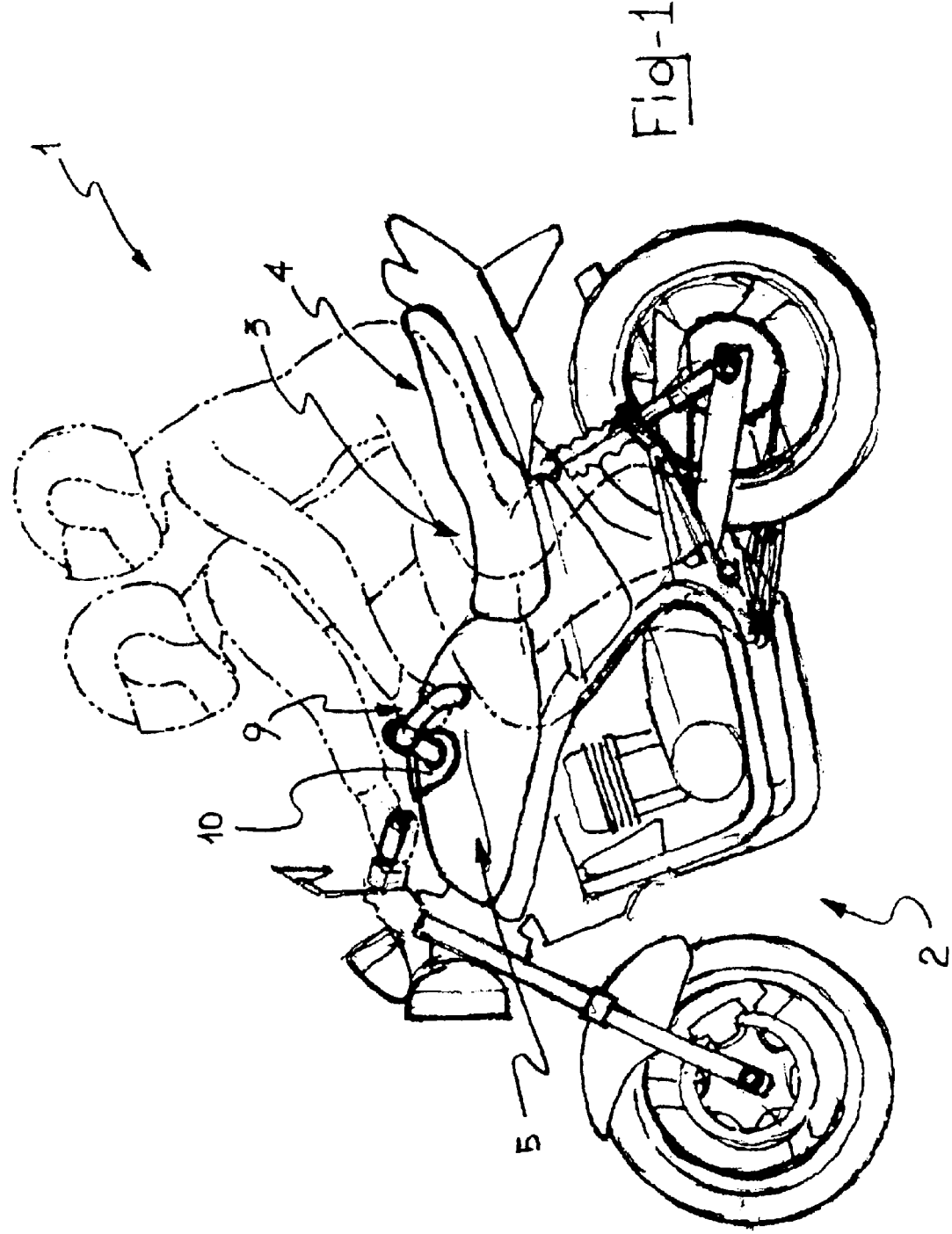
FIG. 1 shows a side view of a motorcycle according to the present invention.
Figure 2:
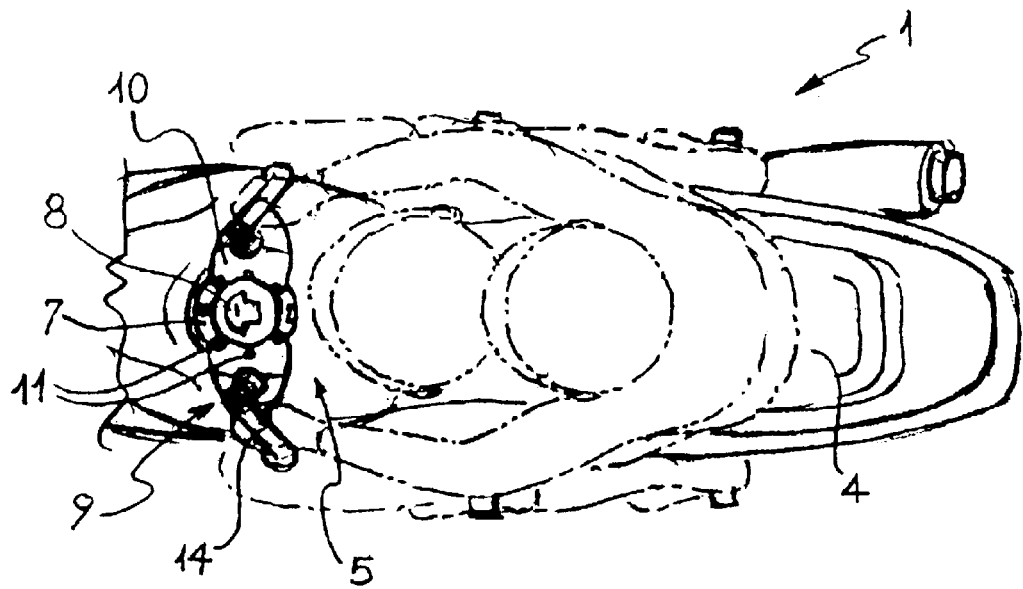
FIG. 2 shows a plan view of the motorcycle of FIG. 1.

With reference to the figures, a motorcycle according to the present invention is generally indicated with 1.

The motorcycle 2 comprises a frame 2, on which a rider's seat 3, a passenger seat 4 and a fuel tank 5 are mounted.

Figure 3:
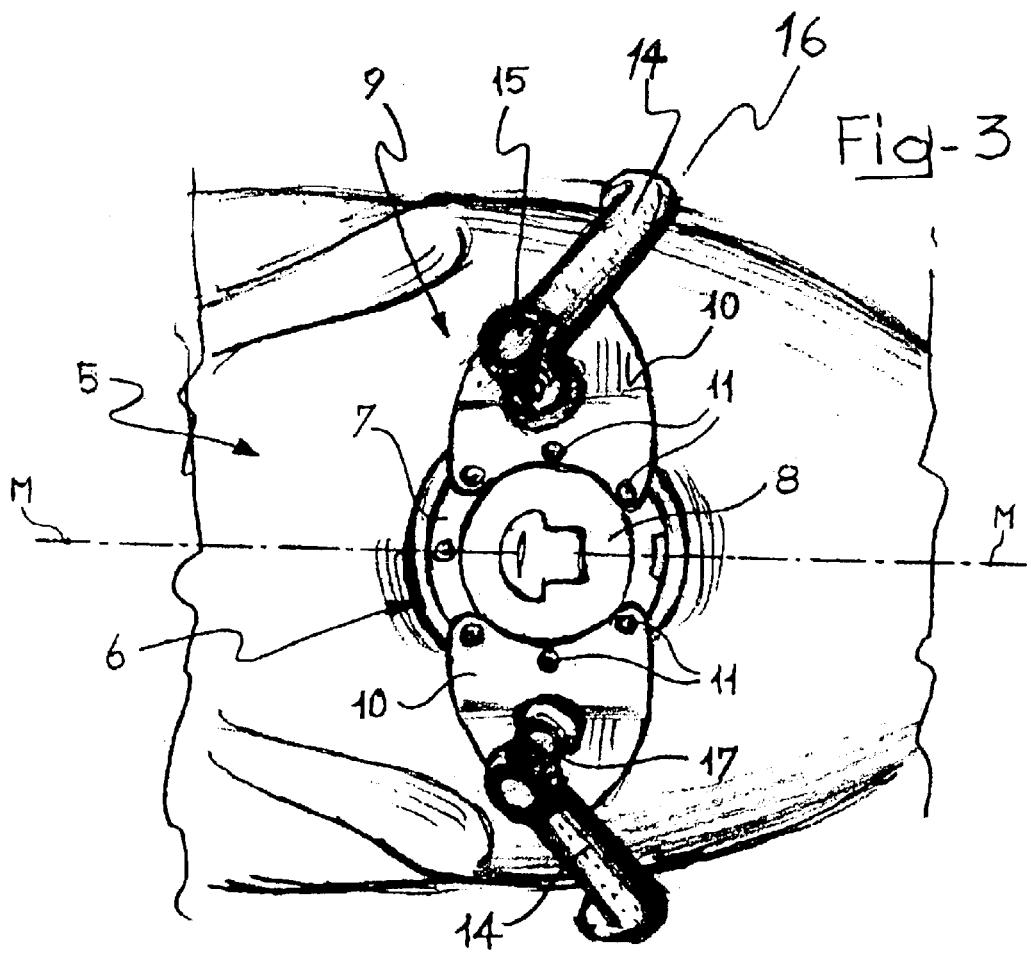
FIG. 3 shows an enlarged plan view of a detail of the motorcycle of FIG. 2.

The tank 5 is fitted with an opening 6 in which an orifice flange 7 for receiving a cap 8 for closing the tank is situated. To said flange 7 is associated a handgrip 9 for the passenger (FIG. 3) and a plurality of screws 12 which, passing through housings 13 of said flange 7 and screwing into the tank 5, fix it firmly to the tank 5.

The handgrip 9 generally comprises at least one base 10 and at least one handle 14 fixed onto said base 10.

The base 10 is flat and plate-shaped, configured so as to stick to the orifice flange 7 and to the tank 5 of the motorcycle.

Said base 10 is equipped with three holes 11, made in predetermined positions, so as to match up, when said base 10 is applied to said orifice flange 7, with the positions of the screws 12 which secure the orifice flange 7 to the fuel tank 5. Such screws 12, passing rough said holes 11 and screwing into their respective housings 13 on the orifice flange 7, stably fix the base 10 of the handgrip 9 to said orifice flange 7.

Figure 4:
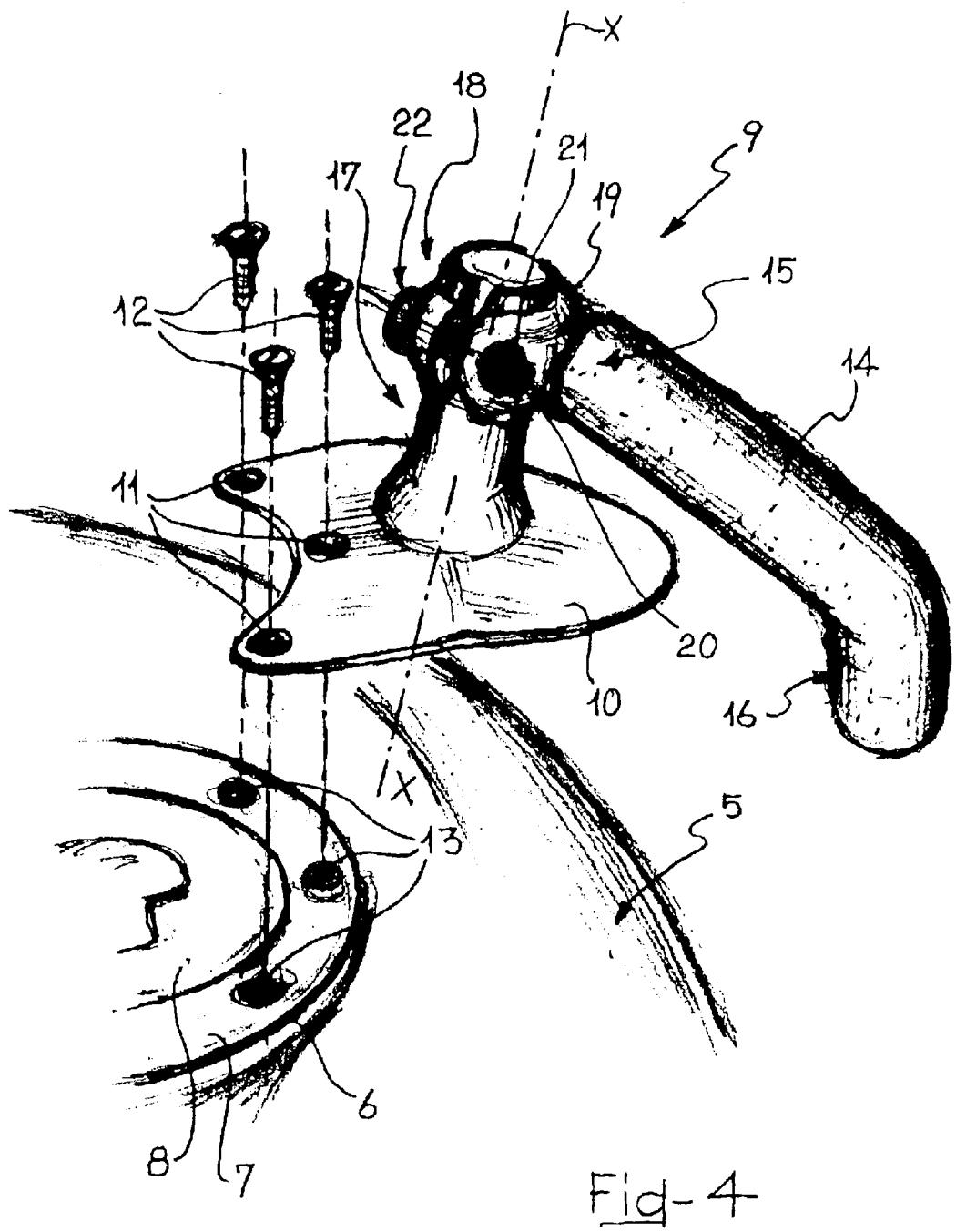
FIG. 4 shows a perspective view with detached parts of a detail of the motorcycle of FIG. 1.

A cylindrical pin 17, having an axis X—X substantially perpendicular to said base 10, according to the non-limiting example represented in FIG. 4, is associated with said base 10. In particular, the cylindrical pin 17 is welded to the base 10.

The handgrip 9 comprises at least one generally cylindrical handle 14, shaped ergonomically to ease its gripping by the passenger, with one end 15 associated with said cylindrical pin 17 and a free end 16. Said handle 14 is preferably curved in the direction of the tank 5 of the motorcycle near to the free end 16 and it is coated with a soft material with a high friction coefficient.

Said end 15 is associated with said cylindrical pin 17 by means of a tie tightening 18, which comprises a metallic band 19 surrounding the cylindrical pin 17, welded to the end 15 of the handle 14, and equipped with two ends each equipped with a hole 20. Said two holes 20 are coaxial and allow the passage of a screw 21, which is tightened thanks to a bolt 22.

The handgrip 9 is removably associated with said flange 7.

Functionally, according to a preferred embodiment, to fix the handgrip 9 to the motorcycle 1 it is necessary, as a first step, to unscrew the screws 12 of the orifice flange 7 at which said handgrip 9 is desired to be secured.

Then the base 10 of the handgrip 9 is rested upon the flange 7, taking care to match up the holes 11 in the base 10 with the housings 13 for the screws 12 in the orifice flange 7.

At this point it is necessary to insert the screws 12 into the aforementioned holes 11, screwing them into the respective housings 13, so as to lock the handgrip 9 in the position in which it is situated.

The tie tightening 18, which carries out the function of fixing the handle 14 to the cylindrical pin 17, allows, if the screw 21 and the bolt 22 loosen, both a rotation of said handle 14 around the aforementioned axis X—X, and a translation thereof along the same axis X—X. In such a way it is possible to adjust the position of the handle 14 with respect to the base 10 in such a way as to maximise the comfort of the handgrip 9.

The main advantage of the motorcycle according to the invention consists in that said handgrip is rigid and light, ensuring safety and stability to the passenger who makes use of it, thus also improving the trim of the vehicle.

A further advantage consists in that said handgrip is easy and cost-effective to install, not just in the factory during the construction of the motorcycle, but also by motorcycle maintenance machine shops.

Due to the simplicity of the handgrip's application to the motorcycle, it can also be installed by the user himself.

The handgrip according to the invention is ergonomic, adjustable and can be fitted compatibly with the encumbrance of the occupants and does not disturb the rider while driving.

Moreover, said handgrip is aesthetically pleasing, since it is morphologically configured like the rider's handlebars.

Furthermore, said handgrip is adaptable to a wide range of models of motorcycle, and thus it can be applied to most motorcycles in circulation.

In accordance with a preferred embodiment (FIG. 3), the handgrip 9 consists of two bases 10 and relative handles 14, which are symmetrical with respect to the longitudinal axis M—M of the motorcycle 1.

According to an embodiment, the plate-shaped base 10 of the handle 14 and the orifice flange 7 itself constitute a single piece. In such a way the assembly of the grip in the construction step of the vehicle is simplified and made more cost-effective.

Figure 5:
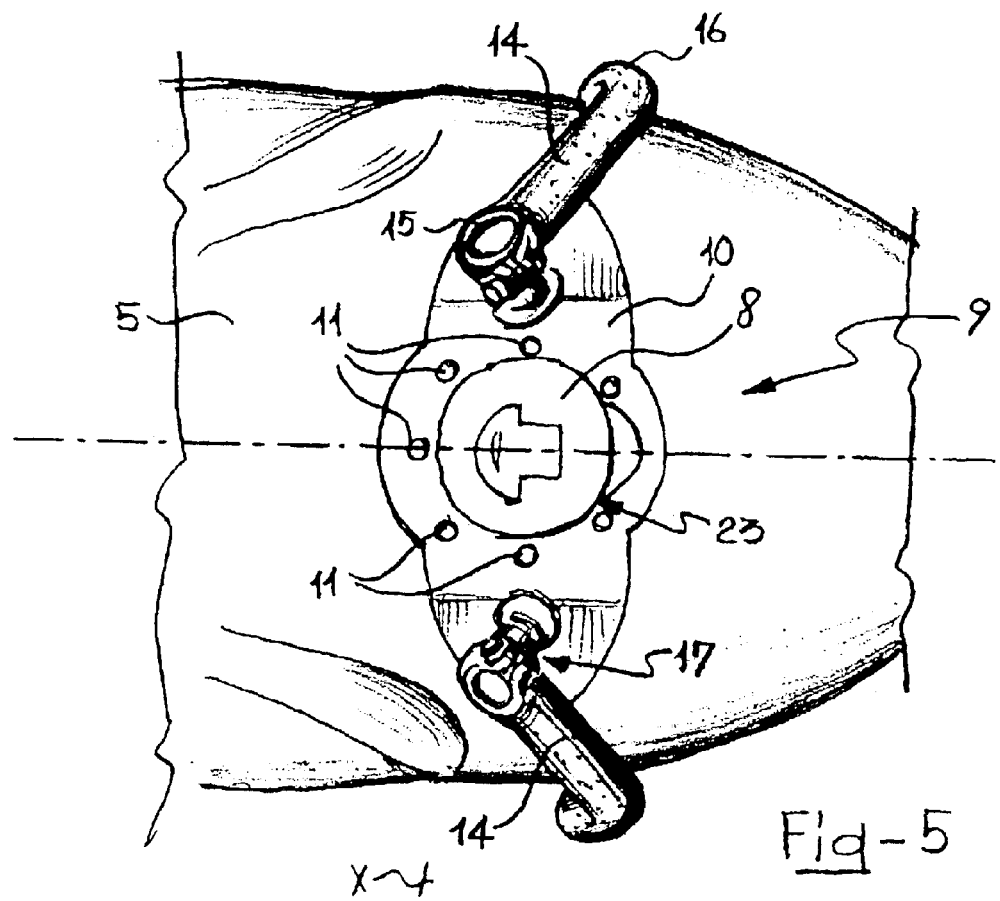
FIG. 5 shows a plan view of the detail of FIG. 3 according to an embodiment of the present invention.

In accordance with a second embodiment of the present invention, as illustrated in FIG. 5, the two bases 10 constitute a single piece, which supports two handles 14, which are symmetrical and opposite with respect to the orifice flange 7.

Said base 10 consisting of a single piece comprises a central hole 23, which makes accessible the cap 8 of the fuel tank 5, and a group of holes 11 positioned at the housings 13 of the screws 12 in the orifice flange 7.

In this way it is possible to use the totality of the screws 12 present on the orifice flange 7 to fix said base 10 to said flange 7.

This solution has the advantage of fixing the handgrip 9 to the orifice flange 7 even more solidly.

Figure 6:
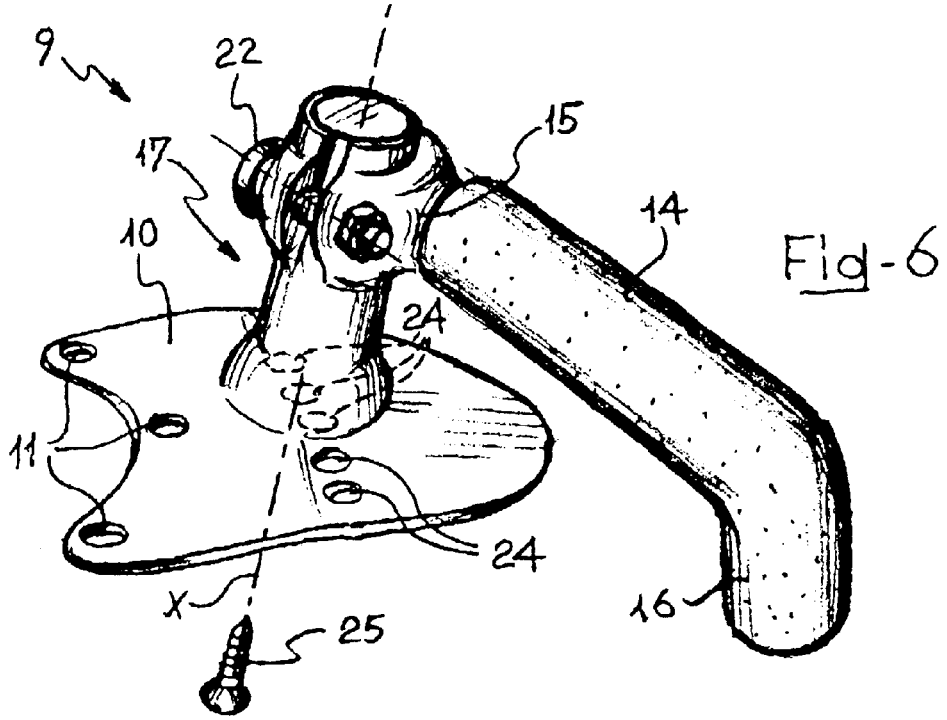
FIG. 6 shows a perspective view with the detached parts of a detail of the motorcycle of FIG. 1 according to a further embodiment of the present invention.

According to a further embodiment of the present invention (FIG. 6), the base 10 of the handgrip 9 is equipped with a plurality of holes 24 in a generally rectilinear arrangement in the direction M—M. Thanks to a screw 25 passing through a hole 24 of said plurality of holes and screwed into the cylindrical pin 17, it is possible to fix the cylindrical pin 17 to said base 10 in different positions, at the user's choice.

Advantageously, in this way the handgrip is further adjustable since it is possible to arrange the pin 17 supporting the handle 14 in the most comfortable position for the passenger.

The invention thus conceived is susceptible to further variants and modifications all of which are within the capabilities of the man skilled in the art and, as such, fall within the scope of protection of the invention itself, as defined by the following claims.

What is claimed is:

1. A motorcycle comprising:
   a frame defining a longitudinal axis of the motorcycle;
   a seat for a rider;
   a seat for a passenger;
   a handgrip for the passenger;
   a fuel tank;
   an opening situated on said tank for filling up with fuel; and
   an orifice flange at said opening for receiving a cap for closing the tank, wherein the handgrip is associated with the orifice flange and is inclined relative to the longitudinal axis.

2. The motorcycle according to claim 1, wherein the handgrip is removably associated with the flange.

3. The motorcycle according to claim 2, wherein the handgrip comprises at least one base and one handle projecting front said base.

4. The motorcycle according to claim 3, wherein the handgrip is fixed to the orifice flange through at least one screw extending through a hole made in the base of said handgrip, said at least one screw being of the type used to fix the orifice flange to the tank.

5. The motorcycle according to claim 3, wherein the base and the orifice flange constitute a single piece.

6. The motorcycle according to claim 4, wherein the handle is fixed to the base in an adjustable manner.

7. The motorcycle according to claim 6, wherein the handgrip comprises a cylindrical pin having an axis X—X and a tie fastening which allow the handle to rotate about the axis X—X and to displace along the same axis X—X.

8. The motorcycle according to claim 7, wherein the cylindrical pin is welded to the base.

9. The motorcycle according to claim 7, wherein the base is equipped with a plurality of holes in a generally rectilinear arrangement.

10. The motorcycle according to claim 9, wherein the cylindrical pin is fixed to the base through a screw passing through a hole of said plurality of holes and screwed into the cylindrical pin.

11. The motorcycle according to claim 5, wherein the handgrip comprises two bases and two respective handles.

12. The motorcycle according to claim 7, wherein said two bases consist of a single piece.

13. The motorcycle according to claim 3, wherein said handgrip comprises a free end curved in the direction of the tank of the motorcycle.

14. The motorcycle according to claim 1, wherein said handgrip is positionable by a user at an acute angle to the longitudinal axis of the motorcycle selected by the user to maximize the comfort of the handgrip.

15. The motorcycle according to claim 1, wherein the handgrip comprises a base attachable to the orifice flange, a pin extending from the base and a handle rotatably attached to the pin.

16. A handgrip for a passenger of a motorcycle comprising:
   a frame defining a longitudinal axis of the motorcycle;
   a seat for the rider;
   a seat for the passenger;
   a handgrip for the passenger;
   a fuel tank,
   an opening for filling up with fuel situated on said tank; and
   an orifice flange at said opening for receiving a cap for closing the tank, wherein the handgrip is intended to be associated with said orifice flange and is inclined relative to the longitudinal axis of the motorcycle.

17. The handgrip for a passenger of a motorcycle according to claim 16, wherein it is removably associated with said flange.

18. The handgrip for a passenger of a motorcycle according to claim 17, wherein it comprises at least one base and one handle projecting from said base.

19. The handgrip for a passenger of a motorcycle according to claim 18, wherein it is fixed to said orifice flange through at least one screw extending through a hole made in the base of said handgrip, said at least one screw being of the type used to fix the orifice flange to the tank.

20. The handgrip for a passenger of a motorcycle according to claim 18, wherein the base and the orifice flange constitute a single piece.

21. The handgrip for a passenger of a motorcycle according to claim 19, wherein the handle is supported by the base in an adjustable manner.

22. The hand grip for a passenger of a motorcycle according to claim 21, further comprising a cylindrical pin having an axis X—X and a tie tightening which allow the handle to rotate about the axis X—X and to translate along the same axis X—X.

23. The handgrip for a passenger of a motorcycle according to claim 22, wherein the cylindrical pin is welded to the base.

24. The handgrip for a passenger of a motorcycle according to claim 22, wherein the base is equipped with a plurality of holes in a generally rectilinear arrangement.

25. The handgrip for a passenger of a motorcycle according to claim 24, wherein the cylindrical pin is fixed to the base through a screw passing through a hole of said plurality of holes and screwed into the cylindrical pin.

26. The handgrip for a passenger of a motorcycle according to claim 25, wherein the handgrip comprises two bases and two respective handles.

27. The handgrip for a passenger of a motorcycle according to claim 26, wherein said two bases consist of a single piece.

28. The handgrip for a passenger of a motorcycle according to claim 18, wherein said handgrip comprises a free end curved in the direction of the tank of the motorcycle.

29. The handgrip for a passenger of a motorcycle according to claim 16, wherein said handgrip is positionable by the user at an acute angle to the longitudinal axis of the motorcycle selected by the user to maximize the comfort of the handgrip.

30. The handgrip for a passenger of motorcycle according to claim 16, wherein the handgrip comprises a base attachable to the orifice flange, a pin extending from the base and a handle rotatably attached to the pan.

* * * * *